United States Patent [19]

Hagiwara et al.

[11] Patent Number: 5,672,427
[45] Date of Patent: Sep. 30, 1997

[54] ZINC OXIDE POWDER HAVING HIGH DISPERSIBILITY

[75] Inventors: Masahiro Hagiwara; Akira Nishihara, both of Omiya, Japan

[73] Assignee: Mitsubishi Materials Corporation, Tokyo, Japan

[21] Appl. No.: 298,709

[22] Filed: Aug. 30, 1994

[30] Foreign Application Priority Data

Aug. 31, 1993 [JP] Japan .................................. 5-216396
Aug. 31, 1993 [JP] Japan .................................. 5-216397
Aug. 31, 1993 [JP] Japan .................................. 5-216398
Aug. 31, 1993 [JP] Japan .................................. 5-216399

[51] Int. Cl.$^6$ ................................ B32B 9/04; C01G 9/02
[52] U.S. Cl. ................. 428/403; 423/622; 428/702; 428/913
[58] Field of Search ........................ 428/402, 403, 428/323, 328, 332, 337, 702, 913; 427/430.1, 443.2, 215, 220, 372.2, 384, 444; 252/518; 106/419, 425, 426, 429; 423/622

[56] References Cited

U.S. PATENT DOCUMENTS 4,072,522 2/1978 Miyatuka ................................ 96/1.8
5,093,099 3/1992 Haishi et al. ........................... 423/622

FOREIGN PATENT DOCUMENTS 2-169673 6/1990 Japan .

*Primary Examiner*—H. Thi Le
*Attorney, Agent, or Firm*—Kubovcik & Kubovcik

[57] ABSTRACT

A zinc oxide powder having high dispersibility, which contains one or more metal elements selected from the group consisting of aluminum, silicon, titanium, vanadium, chromium, manganese, iron, cobalt, gallium, germanium, zirconium, indium, tin and hafnium in an amount of from 0.1 to 25 atm. % relative to the total amount of metal elements including zinc. The powder has an average primary particle size of up to 1 μm and a relative transmissivity of at least 0.80. The improved properties are obtained by improving the surface of the powder by immersing the powder in one or more organic liquids selected from the group consisting of alcohols, ketones, amines and esters, and then drying the particles. When containing one or more of aluminum, gallium, germanium, indium and tin, the zinc oxide powder of the invention displays high electric conductivity and is therefore applicable as a conductive pigment.

6 Claims, No Drawings

ZINC OXIDE POWDER HAVING HIGH DISPERSIBILITY

BACKGROUND OF THE INVENTION

The present invention relates to a zinc oxide powder having high dispersibility. The powder of the present invention is useful for forming a conductive layer or a conductive film and for antistatic uses, as a transparent or white conductive pigment.

Zinc oxide powder having a chemical composition comprising one or more metals selected from the group consisting of aluminum, gallium, germanium, indium and tin in a ratio of from 0.1 to 25 atm. %, and the balance being substantially zinc oxide, with an average primary particle size of up to 1 µm, is disclosed, for example, in Japanese Patent Publication No. 55-19896, Japanese Patent Publication No. 62-35970 and Japanese Patent Provisional Publication No. 3-23220. This zinc oxide powder has high electric conductivity and is used for forming a conductive layer on electrostatic recording paper, electro-thermosensitive recording paper, discharge recording paper and the like, and for forming a transparent conductive film.

There is at present an increasing demand for reducing the thickness of the above-mentioned conductive layer on recording paper and transparent film to cope with the recent tendency toward cost reduction and downsizing. However, a conductive pigment comprising the above-mentioned conventional zinc oxide powder has low dispersibility when converted into a paint, so that it is difficult to form a conductive layer or a conductive film having uniform properties in the form of a thin film, and conductivity as a whole decreases. In the form of a transparent conductive film, the decreased dispersibility results in light scattering, thus impairing transparency.

Transparent conductive pigments are used also for antistatic purposes. More specifically, a conductive pigment, in the form of a paint, is used by applying a film or a tape onto the surface of a cathode-ray tube of a television set to form an antistatic layer. A conductive pigment kneaded into a resin is used by forming the kneaded resin into a shape or a sheet having an antistatic property. In this case, the conductive pigment is also required to have high dispersibility with a view to achieving uniform properties and improving performance. Particularly, when forming an antistatic layer on a glass substrate such as a cathode-ray tube or other transparent substrate, it is necessary to achieve a high degree of transparency, and uniform dispersion of the conductive pigment is important.

SUMMARY OF THE INVENTION

It is an object of the present invention to provide a zinc oxide powder useful as a conductive pigment and having high dispersibility.

The present inventors have found that by improving the surface of a conductive zinc oxide powder containing one or more metal elements selected from the group consisting of the above-mentioned aluminum, gallium, germanium, indium and tin by means of a specific organic liquid, it is possible to largely improve the dispersibility of the powder without impairing the conductivity thereof.

According to the present invention, there is provided a zinc oxide powder having high dispersibility, which contains one or more metal elements selected from the group consisting of aluminum, silicon, titanium, vanadium, chromium, manganese, iron, cobalt, gallium, germanium, zirconium, indium, tin and hafnium, in an amount of from 0.1 to 25 atm. % relative to the total amount of metals including zinc, has an average primary particle size of up to 1 µm, and has a surface improved by treatment with a surface-improving agent comprising one or more organic substances selected from the group consisting of alcohols, ketones, amines and esters.

DETAILED DESCRIPTION OF THE INVENTION

The zinc oxide powder of the present invention is provided by surface-improvement of a zinc oxide powder which contains one or more metal elements selected from the group consisting of aluminum, silicon, titanium, vanadium, chromium, manganese, iron, cobalt, gallium, germanium, zirconium, indium, tin and hafnium in an amount of from 0.1 to 25 atm. % relative to the total amount of metals including zinc, the balance being substantially zinc oxide, and which has an average primary particle size of up to 1 µm (hereinafter referred to as "non-improved" zinc oxide powder), the surface-improvement being accomplished by the use of one or more organic substances selected from the group consisting of alcohols, ketones, amines and esters.

The non-improved zinc oxide powder may be one manufactured by any conventionally known method. Such methods of manufacturing a zinc oxide powder are disclosed, for example, in the above-mentioned Japanese Patent Publication No. 55-19896, Japanese Patent Publication No. 62-35970 and Japanese Patent Provisional Publication No. 3-23220.

In the zinc oxide powder, the content of metal elements (the sum of the metal contents, i.e., a value based on the total amount of zinc and other metal elements) should be within a range of from 0.1 to 25 atm. % because a content under 0.1 atm. % does not ensure a sufficient electric conductivity, and a content of over 25 atm. % does not result in further improvement. The content of the metal elements should preferably be within a range of from 0.1 to 10 atm. % or, more preferably, within a range of from 0.5 to 8 atm. %.

When using the zinc oxide powder as a conductive pigment, as described above, the powder preferably contains one or more metal elements selected from the group consisting of aluminum, gallium, germanium, indium and tin in an amount of at least 0.1 atm. %.

The zinc oxide powder should have an average primary particle size of up to 1 µm. With an average primary particle size of over 1 µm, the surface improvement treatment does not provide improved dispersibility. It is necessary to use a zinc oxide powder having an average primary particle size of preferably up to 0.5 µm, or more preferably, up to 0.2 µm for a use requiring transparency. With an average primary particle size of over 0.5 µm, transparency decreases and the powder is tinted with white. The powder is, however, useful for uses such as, for example, a conductive layer for recording paper.

Surface improvement of the zinc oxide powder is accomplished by using one or more organic liquids selected from the group consisting of alcohols, ketones, amines and esters as a surface improvement agent, immersing the powder in the liquid, and then drying the immersed powder. Suitable organic liquids are compounds having a polar group such as a hydroxyl group, a ketone group, an amine group, or an ester group.

Suitable alcohols include monohydric and polyhydric aliphatic, alicyclic and aromatic alcohols which are in a liquid phase at the immersion temperature. Examples of such alcohols include methanol, ethanol, 1- and 2-propanol, n-, i-, s- and t-butanol, amyl alcohol, hexanol, methyl isobutyl carbinol, 2-ethyl butanol, octanol, cyclohexanol, benzyl alcohol, phenethyl alcohol, ethylene glycol, propylene glycol, and diethylene glycol. Alkoxy alcohols such as ethoxy ethanol and butoxy ethanol are also applicable. Preferred alcohols are methanol, ethanol, propanol, cyclohexanol, ethylene glycol and butoxy ethanol.

Suitable ketones include, but are not limited to, acetone, methyl ethyl ketone, diethyl ketone, methyl isobutyl ketone, cyclohexanone, isophorone, and acetylacetone. Preferred ketones include acetone, methyl ethyl ketone, methyl isobutyl ketone, cyclohexanone and isophorone.

Suitable amines include aliphatic, alicyclic, aromatic and heterocyclic amines which are in liquid phase at the immersion temperature. Examples include dimethylamine, trimethylamine, diethylamine, triethylamine, tributylamine, dimethylformamide, cyclohexylamine, ethylenediamine, monoethanolamine, aniline, pyridine, quinoline, picoline, and morpholine. Preferred amines are dimethylamine, trimethylamine, tributylamine, dimethylformamide, cyclohexylamine and ethylenediamine.

Any ester which is in a liquid phase at the immersion temperature can be used. Suitable esters include methyl acetate, ethyl acetate, propyl acetate, isopropyl acetate, butyl acetate, amyl acetate, hexyl acetate, 2-ethylhexyl acetate, methyl propionate, ethyl propionate, butyl propionate, butyl butyrate, ethyl lactate, ethylene glycol monoacetate, and ethylene glycol monoethyl ether monoacetate. Preferred esters include methyl acetate, ethyl acetate, propyl acetate, butyl acetate, ethyl lactate, and ethylene glycol monoethyl ether monoacetate.

One or more of these organic liquids are used as a surface improvement agent, and the zinc oxide powder is immersed therein. There is no particular limitation on the treatment temperature: it can be higher or even lower than room temperature, and it suffices usually to use room temperature. The immersion time should generally be within a range of from 10 to 200 minutes, more preferably, of from 20 to 180 minutes, or even more preferably, of from 30 to 150 minutes. Because the zinc oxide powder is very fine as described above, and easily aggregates in the liquid, it is desirable to disperse the zinc oxide powder in the treatment liquid during the immersion treatment by, for example, shaking or ultrasonic waves.

By separating the immersion-treated zinc oxide powder from the organic liquid followed by drying, the surface-improved zinc oxide powder of the present invention is obtained. Drying may be accomplished either by spontaneous drying or by heating. Heating for drying should preferably be carried out in a vacuum or in an inert atmosphere (nitrogen or argon, for example), and the drying temperature should be up to 500° C., or more preferably, within a range of from 50° to 300° C. The surface-improved zinc oxide powder of the present invention obtained through immersion in an improvement agent followed by drying exhibits highly improved dispersibility when converted into a paint.

The zinc oxide powder of the present invention is useful as a transparent conductive pigment in all cases. Particularly when the zinc oxide powder contains at least one of aluminum, gallium, germanium, indium and tin in an amount of at least 0.1 atm. %, it displays a very high conductivity as represented by a volume resistivity (as measured under a pressure of 100 kg/cm$^2$) of the powder on the order of from $10^{-1}$ to $10^2$ Ω.cm, and is applicable for forming a conductive layer for electrostatic recording paper, electro-thermosensitive recording paper, discharge recording paper and the like, and for forming a transparent conductive film. When formed into a thin film, this conductive pigment is uniformly distributed because of the improved dispersibility of the zinc oxide powder. This provides improved transparency and conductivity of the thus-formed thin film conductive layer or conductive film. There is thus available a conductive layer or a conductive film having excellent conductivity as represented by a surface resistance on the order of from $10^6$ to $10^7$ Ω/□.

Even when the zinc oxide powder contains metals other than those enumerated above, although resistance becomes slightly higher, adequate conductivity is present, and a film having a surface resistance of about $10^9$ to $10^{11}$ Ω/□ can be formed. Such a conductive film is useful as an antistatic layer, for example.

Preferred binders useful when manufacturing a paint from the zinc oxide powder include acrylic resin, epoxy resin, polyester resin, polyurethane resin, polycarbonate resin, water-soluble alkyd resin, polyvinyl alcohol and metal alkoxide. The ratio of binder (solid)/zinc oxide powder in the paint should be within a range of from 10/90 to 90/10, or more preferably, of from 10/90 to 40/60. The coated film formed with this paint (a conductive layer, a conductive film, an antistatic layer, etc.) should have a thickness within a range of from 1 to 50 μm. Because of the excellent dispersibility exhibited by the zinc oxide powder of the present invention, a film in which the zinc oxide powder is substantially uniformly distributed is available even when formed into a thin film thinner than 10 μm.

The present invention is described below in further detail by means of examples. The examples are only selected actual cases, and the present invention is not limited to these examples.

EXAMPLES

Zinc oxide powders A to T were prepared, having the metal contents and average primary particle sizes as shown in Table 1. Some of these zinc oxide powders were commercially available, and the others were prepared through coprecipitation of hydroxides from water-soluble zinc salt and a slight amount of water-soluble metal salt with the use of ammonium carbonate, and calcining the resultant hydroxides in a nitrogen atmosphere at a temperature within a range of from 300° to 800° C.

Each of these zinc oxide powders was surface-improved through an immersion treatment with various organic liquids as the surface improvement agents under the conditions as shown in Table 2 and a subsequent drying, resulting in a zinc oxide powder of the present invention.

Using the surface-improved zinc oxide powder as the pigment, a paint was prepared. More specifically, 5 g of each pigment was shaken with xylene in an amount of 10 g in a paint shaker (using 20 g glass beads) for 60 minutes to disperse the pigment in xylene. Acrylic resin (40% solid) in an amount of 5.36 g was added to the thus obtained dispersion liquid to reach a pigment content of 70 wt. % in the state of a dried coated film, and the mixture was shaken for another 30 minutes. After removal of the glass beads, the resultant paint was applied onto a PET (polyethylene terephthalate) film substrate by means of a bar coater to achieve a dried film thickness of 2 μm, and then dried at 100° C. to complete the coated film. These PET substrates, each provided with a coated film, were used as samples to be subjected to the following tests.

First, to evaluate the dispersibility of the samples, optical transmissivity at a wavelength of 550 nm was measured. The ratio of the measured transmissivity of the samples, each sample comprising a PET film substrate and a coated film thereon to the optical transmissivity of the PET film itself serving as the substrate and having a transmissivity of 89% was determined and presented as the relative transmissivity.

A higher dispersibility corresponds to less optical scattering caused by aggregated particles, leading to a higher transmissivity, so that transmissivity of visual light serves as an indicator of dispersibility. A relative transmissivity of 1.00 means that the sample shows the same optical transmissivity as that of the substrate, i.e., the optical transmissivity of the coated film itself is 100%.

Evaluation of electric conductivity was made through measurement of the surface resistance value of the samples by means of a Loresta AP manufactured by Mitsubishi Petrochemical Co., Ltd.

For comparison purposes, similar tests were carried out also for non-improved zinc oxide powders prior to the above-mentioned surface improvement treatment. The results of these tests are comprehensively shown in Table 2.

TABLE 1

| Powder Symbol | Metal elements in zinc oxide powder and contents thereof (atm. %, bal.: ZnO) | | | | | | | Average Particle Size (μM) |
|---|---|---|---|---|---|---|---|---|
| | (1) | % | (2) | % | (3) | % | (3) | % |
| A | Al | 5 | | | | | | 0.03 |
| B | Si | 3 | | | | | | 0.05 |
| C | Ti | 0.8 | | | | | | 0.46 |
| D | V | 5 | | | | | | 0.07 |
| E | Cr | 0.3 | | | | | | 0.02 |
| F | Mn | 3 | | | | | | 0.04 |
| G | Fe | 10 | | | | | | 0.10 |
| H | Co | 5 | | | | | | 0.05 |

TABLE 1-continued

| Powder Symbol | Metal elements in zinc oxide powder and contents thereof (atm. %, bal.: ZnO) | | | | | | | Average Particle Size (μM) |
|---|---|---|---|---|---|---|---|---|
| | (1) | % | (2) | % | (3) | % | (3) | % |
| I | Ga | 8 | | | | | | 0.07 |
| J | Ge | 5 | | | | | | 0.03 |
| K | Zr | 2 | | | | | | 0.15 |
| L | In | 25 | | | | | | 0.40 |
| M | Sn | 7 | | | | | | 0.05 |
| N | Hf | 12 | | | | | | 0.30 |
| O | Al | 2 | Mn | 2 | Ga | 5 | | | 0.02 |
| P | Ti | 1 | Fe | 4 | In | 2 | | | 0.07 |
| Q | Si | 5 | Fe | 1 | Zr | 2 | | | 0.10 |
| R | V | 1 | Ga | 1 | Hf | 1 | | | 0.25 |
| S | Cr | 3 | Fe | 2 | | | | | 0.03 |
| T | Al | 1 | Si | 1 | Fe | 12 | In | 3 | 0.05 |

TABLE 2

| Test No. | Powder symbol | Surface improvement conditions of zinc oxide powder | | | | | Properties of surface-impr. powder (Invention) | | Properties of non-surface-impr. powder (Comparative) | |
|---|---|---|---|---|---|---|---|---|---|---|
| | | Immersion | | Drying | | | Relative trans-missivity | Surface resistance (Ω/□) | Relative trans-missivity | Surface resistance (Ω/□) |
| | | Improvement agent | Time (min) | Atmo-sphere | Temp. (°C.) | Time (min) | | | | |
| 1 | A | Ethanol | 100 | Vacuum | 100 | 60 | 1.00 | $7.2 \times 10^6$ | 0.72 | $1.5 \times 10^7$ |
| 2 | B | Ethylene glycol | 20 | | 70 | 100 | 0.98 | $2.7 \times 10^{10}$ | 0.70 | $9.1 \times 10^{10}$ |
| 3 | C | Methanol | 90 | Spontaneous drying | | | 0.91 | $6.5 \times 10^{10}$ | 0.45 | $8.9 \times 10^{10}$ |
| 4 | D | 2-propanol | 70 | Nitrogen | 150 | 120 | 0.96 | $2.8 \times 10^{11}$ | 0.67 | $8.5 \times 10^{11}$ |
| 5 | E | Butoxy ethanol | 30 | | 250 | 90 | 1.00 | $5.2 \times 10^{10}$ | 0.74 | $2.3 \times 10^{11}$ |
| 6 | F | Acetone | 50 | Vacuum | 150 | 30 | 0.98 | $1.4 \times 10^{11}$ | 0.71 | $9.5 \times 10^{11}$ |
| 7 | G | Methyl ethyl ketone | 80 | Nitrogen | 70 | 40 | 0.92 | $1.2 \times 10^9$ | 0.60 | $1.2 \times 10^{10}$ |
| 8 | H | Methyl isobutyl ketone | 40 | | 100 | 100 | 0.96 | $3.1 \times 10^{10}$ | 0.69 | $9.8 \times 10^{10}$ |
| 9 | I | Cyclohexane | 120 | Vacuum | 80 | 60 | 0.98 | $4.1 \times 10^7$ | 0.68 | $2.4 \times 10^8$ |
| 10 | J | Isophorone | 20 | Spontaneous drying | | | 1.00 | $1.1 \times 10^7$ | 0.73 | $9.5 \times 10^7$ |
| 11 | K | Dimethylamine | 50 | Vacuum | 100 | 40 | 0.91 | $3.2 \times 10^9$ | 0.60 | $4.2 \times 10^{10}$ |
| 12 | L | Tributylamine | 100 | | 70 | 90 | 0.92 | $2.1 \times 10^6$ | 0.55 | $1.1 \times 10^7$ |
| 13 | M | Dimethylformamide | 40 | Spontaneous drying | | | 0.99 | $8.0 \times 10^6$ | 0.72 | $3.2 \times 10^7$ |
| 14 | N | Trimethylamine | 30 | Nitrogen | 280 | 40 | 0.90 | $2.9 \times 10^{10}$ | 0.57 | $2.8 \times 10^{11}$ |
| 15 | O | Ethylenediamine | 50 | | 250 | 30 | 1.00 | $2.8 \times 10^7$ | 0.75 | $4.2 \times 10^8$ |
| 16 | P | Methyl acetate | 100 | Vacuum | 180 | 80 | 0.97 | $7.2 \times 10^6$ | 0.65 | $2.3 \times 10^7$ |
| 17 | Q | Ethyl acetate | 60 | | 120 | 60 | 0.96 | $5.2 \times 10^9$ | 0.71 | $1.4 \times 10^{10}$ |
| 18 | R | Propyl acetate | 80 | Nitrogen | 280 | 30 | 0.92 | $2.1 \times 10^7$ | 0.57 | $1.0 \times 10^8$ |
| 19 | S | Butyl acetate | 30 | | 70 | 120 | 1.00 | $1.6 \times 10^{10}$ | 0.75 | $7.8 \times 10^{10}$ |
| 20 | T | Ethyl lactate | 120 | Spontaneous drying | | | 0.97 | $1.0 \times 10^7$ | 0.71 | $7.2 \times 10^7$ |
| 21 | F | Cyclohexanol | 80 | Vacuum | 150 | 90 | 0.95 | $3.2 \times 10^{11}$ | 0.71 | $9.5 \times 10^{11}$ |
| 22 | T | 1-propanol | 90 | Spontaneous drying | | | 1.00 | $1.7 \times 10^7$ | 0.71 | $7.2 \times 10^7$ |
| 23 | O | Cyclohexylamine | 80 | Vacuum | 120 | 70 | 1.00 | $2.8 \times 10^7$ | 0.72 | $4.2 \times 10^8$ |
| 24 | N | Ethylene glycol mono-ethyl ether monoacetate | 30 | Nitrogen | 120 | 60 | 0.90 | $1.9 \times 10^{10}$ | 0.57 | $2.8 \times 10^{11}$ |

As is evident from Table 2, the surface-improved zinc oxide powders of the present invention have a relative tranmissivity of at least 0.80. More particularly, these surface-improved powders were confirmed to have a very high relative transmissivity in the visual region ranging from 0.90 to 1.00, and to be so excellent in dispersibility as to ensure completely uniform dispersion. In the non-improved zinc oxide powders, in contrast, the relative transmissivity ratio was as low as from 0.45 to 0.75, with poor dispersibility, resulting in films of decreased transparency. Comparisons between identical zinc oxide powders show a remarkable improvement in transparency and dispersibility as typically represented by a relative transmissivity increase of at least 0.25 as a result of the dispersibility improvement brought about by surface improvement in the present invention.

With regard to the surface resistance value, all the surface-improved zinc oxide powders of the present invention show a lower surface resistivity than the corresponding non-improved zinc oxide powders, suggesting that the surface improvement in the present invention for improving dispersibility does not reduce electric conductivity, but a uniform dispersion of zinc oxide powder improves conductivity of the film.

More specifically, in the sample Nos. 1, 9, 10, 12, 13, 15, 16, 18, 20, 21 and 23 using the powders A, I, J, L, M, O, P or R containing at least one metal selected from the group consisting of aluminum, gallium, germanium, indium and tin, while both the non-improved and the surface-improved zinc oxide powders were low in resistance, the surface-improved powders of the present invention showed further reduced values of surface resistance such as from $10^6$ to $10^7$ $\Omega/\square$ as compared with those from $10^7$ to $10^8$ $\Omega/\square$ of the non-improved powders. For the other zinc oxide powders containing metal elements other than those specified in the present invention, the value of surface resistance was lower than those for the non-improved powders as a result of surface improvement.

What is claimed is:

1. A modified zinc oxide powder having a surface that has been modified to improve dispersibility thereof, said modified powder being obtained by a process consisting of contacting (a) an unmodified zinc oxide powder comprising 0.1 atomic % to 25 atomic % relative to a total amount of metals including zinc of at least one metal selected from the group consisting of aluminum, silicon, titanium, vanadium, chromium, manganese, iron, cobalt, gallium, germanium, zirconium, indium, tin, and hafnium, the balance being substantially zinc oxide, and having an average primary particle size of up to 1 μm with (b) a surface improvement agent consisting of at least one organic liquid selected from the group consisting of alcohols, ketones, amines and esters and drying the resultant powder; said modified powder having a relative transmissivity at least 0.24 higher than a relative transmissivity of said unmodified powder.

2. The modified zinc oxide powder of claim 1, wherein said modified powder has a relative transmissivity of at least 0.8.

3. The modified zinc oxide powder of claim 1, wherein said modified powder has a relative transmissivity within the range of 0.90 to 1.00.

4. The modified zinc oxide powder of claim 1, wherein said unmodified powder contains at least 0.1 atomic % relative to the total amount of metals including zinc of at least one metal selected from the group consisting of aluminum, gallium, germanium, indium, and tin.

5. The modified zinc oxide powder of claim 1, wherein said unmodified powder contains 0.1 atomic % to 10 atomic % of said at least one metal.

6. The modified zinc oxide powder of claim 1, wherein said unmodified powder has an average primary particle size of not greater than 0.5 μm.

* * * * *